(No Model.)
E. W. DUKE.
COTTON PLANTER.
No. 350,233. Patented Oct. 5, 1886.
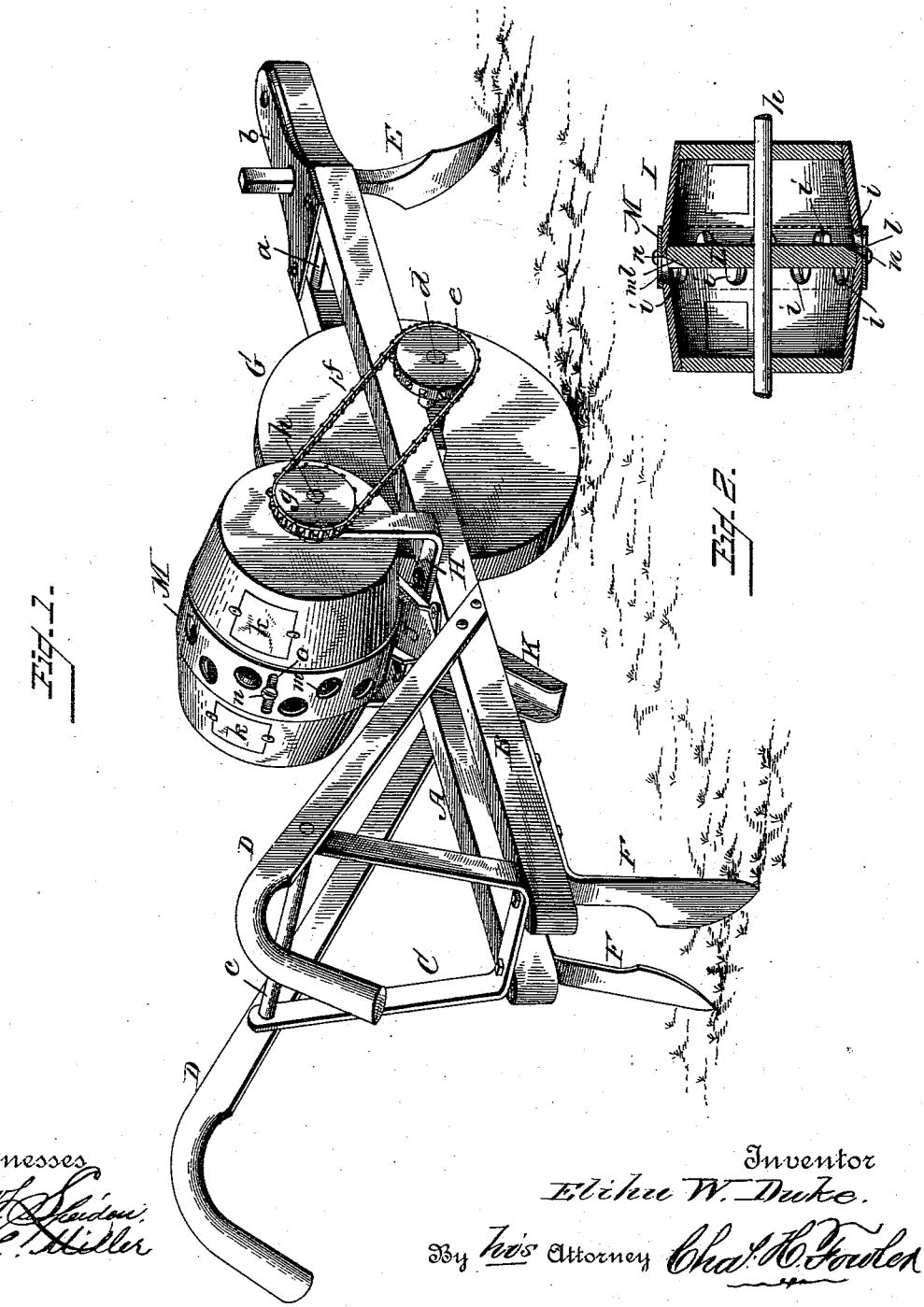
Witnesses
Wm L. Sladen
L. L. Miller
Inventor
Elihu W. Duke.
By his Attorney Chas. H. Fowler

UNITED STATES PATENT OFFICE.

ELIHU W. DUKE, OF JACKSON, GEORGIA.

COTTON-PLANTER.

SPECIFICATION forming part of Letters Patent No. 350,233, dated October 5, 1886.

Application filed June 29, 1886. Serial No. 206,647. (No model.)

*To all whom it may concern:*

Be it known that I, ELIHU W. DUKE, a citizen of the United States, residing at Jackson, in the county of Butts and State of Georgia, have invented certain new and useful Improvements in Cotton-Planters; and I do hereby declare that the following is a full, clear, and exact description of the same, reference being had to the annexed drawings, making a part of this specification, and to the letters and figures of reference marked thereon.

Figure 1 of the drawings is a perspective view of my invention, and Fig. 2 a detail sectional view of the hopper.

The present invention has relation to that class of seed-planters in which is employed a rotary cylindrical hopper tapering at its ends and divided into two compartments by a central partition, and provided with discharge-openings.

It is the object of the invention to improve the construction of the above-described class of seed-planters, whereby they are rendered more perfect in their operation in distributing the seed, less liability of the discharge-openings to becoming clogged, and in many particulars superior to those in ordinary use, which objects I attain by the construction substantially as shown in the drawings, and hereinafter described and claimed.

In the accompanying drawings the frame of the planter consists of two longitudinal and parallel beams connected at their forward ends by a central brace. The beams A B and the brace $a$ are preferably of wood, although other materials may be used, and in addition to the brace $a$, plates $b$, which are of metal, and may be secured to the upper and under sides of the beams at their forward ends to strengthen them. The rear ends of the beams A B are connected together by a metal brace, C. This brace is of U shape. Its free or upper extremities, to which the handles D are connected by means of the cross-bar $c$, form braces and stays for said handles, thereby a simple and durable brace for both the beams A B and handles D.

The forward end of the planter is provided with the usual furrow-opener or plow, E, and to the rear end of the planter are the coverers F. Between the beams A B is located the driving-wheel G, the axle $d$ thereof having its bearings in suitable boxes connected to the under side of the beams. Upon one end of the axle $d$ is keyed a sprocket-wheel, $e$, over which passes a sprocket-chain, $f$, said chain also connecting a sprocket-wheel, $g$, on the end of a shaft, $h$. The shaft $h$ has its bearings in a U shape metal frame, H, bolted to the upper side of the beams A B, and to said shaft is rigidly secured the hopper I, which contains the cotton or other seed.

I do not desire to confine myself to the means shown for imparting to the hopper a rotary motion, as any well-known mechanism may be substituted, such as belts and pulleys, an arrangement of friction-pulleys or gear-wheels, a suitable arrangement of levers or other preferred means that will give to the hopper a rotary motion through the medium of the wheel G.

Under the hopper I is a chute, J, which terminates in an inclined spout, K, which extends down between the beams A B in the rear of the wheel G, by which means the seed is delivered into the furrow.

The hopper I is divided into two compartments by a central partition, L, and the hopper upon each side of the partition inclines downwardly, thereby making the hopper tapering from its center toward its ends, and the hopper being cylindrical in form, the seed will be guided to the discharge-openings as they reach their lowest point. By means of the two separate compartments in the hopper both cotton-seed and guano can be distributed at one and the same time, the hopper being supplied through doors $k$. As will be noticed, the discharge-openings $i$ are arranged alternately on different vertical planes, each set of openings communicating with their respective compartments in the hopper. The openings of each set have an inclination toward each other, as shown more clearly in Fig. 2, such inclination being in a direction toward the partition L, so that when the seed and guano are distributed they will mix with each other. In order to facilitate the discharge of the seed and fertilizer or guano at points opposite each opening $i$, the partition L is cut away to form a guide-chute, $l$, thereby preventing the seed or fertilizer from caking around the opening, and insuring a free discharge thereof. The size of the discharge-openings $i$ are regulated by a gage-band, M, which has openings $n$ to correspond with those of the hopper, and is laterally adjustable by means of set-screws $n$ and transverse slots $o$. Any desirable means may be employed for rendering the gage-band M adjustable, so as to either close or regulate the size of the discharge-openings, and I do not desire to be understood as confining myself to any particular form or construction of plows or furrow-openers, or of the coverers, or to the construction of the frame, as these can be changed at will without departing from the principle of my invention.

Having now fully described my invention, what I claim as new, and desire to secure by Letters Patent, is—

A cotton-seed or other planter provided with a rotary cylindrical hopper tapering from its center toward its ends, and provided with inwardly-inclined discharge-openings, a central partition dividing the hopper into two compartments, and cut away opposite each discharge-opening to form chutes thereto, and an adjustable gage-band to close or regulate the size of the discharge-openings, substantially as and for the purpose set forth.

In testimony that I claim the above I have hereunto subscribed my name in the presence of two witnesses.

ELIHU W. DUKE.

Witnesses:
R. M. FLETCHER,
J. F. CARMICHAEL.